Aug. 13, 1946.    A. CROT    2,405,643
STRUCTURAL CONNECTOR
Filed Feb. 7, 1944
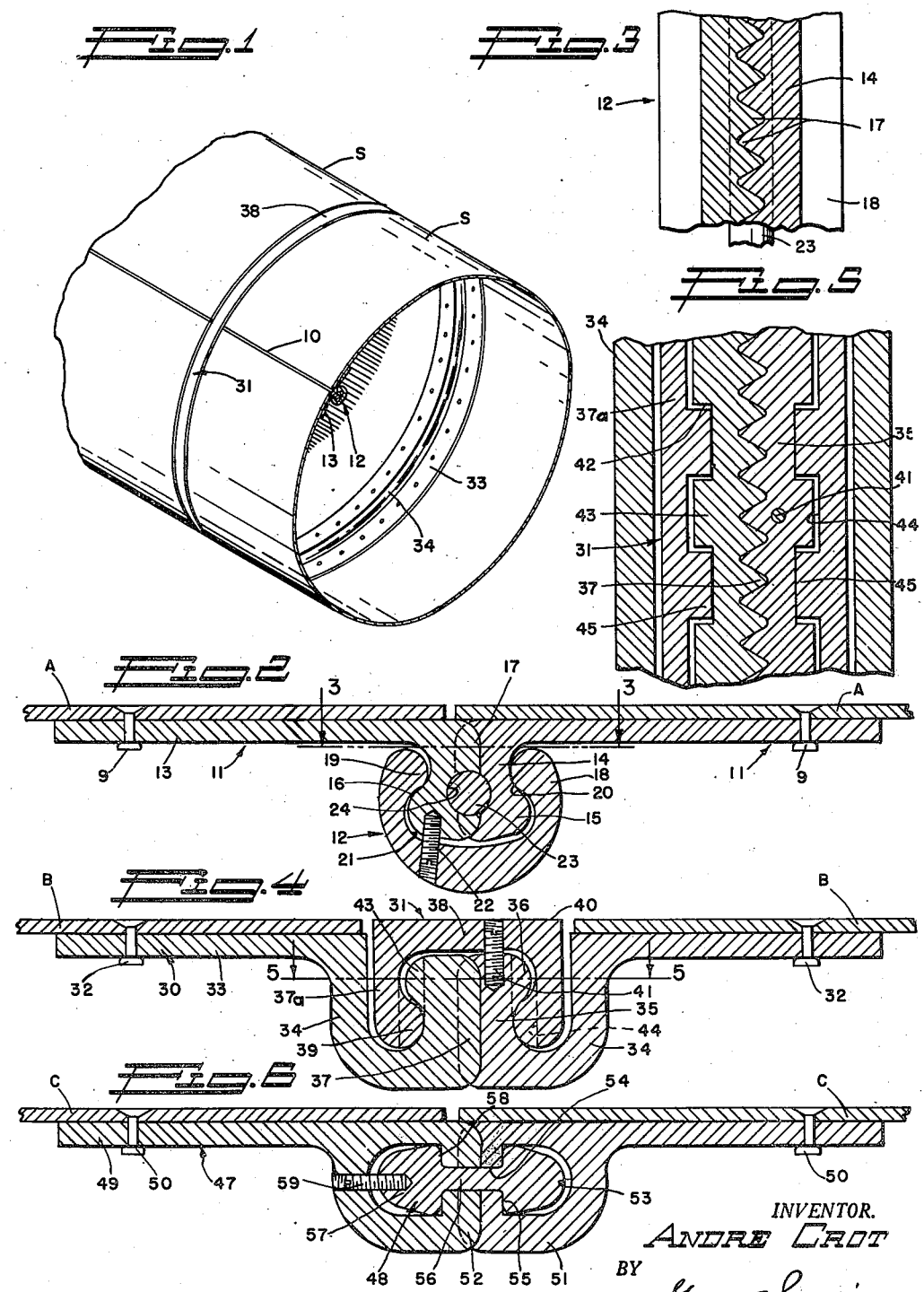
INVENTOR.
ANDRE CROT
BY
George C. Sullivan
AGENT Patented Aug. 13, 1946

2,405,643

UNITED STATES PATENT OFFICE 2,405,643

STRUCTURAL CONNECTOR

André Crot, Los Angeles, Calif., assignor to Lockheed Aircraft Corporation, Burbank, Calif.

Application February 7, 1944, Serial No. 521,477

6 Claims. (Cl. 189—36)

This invention relates to structural connections, and relates more particularly to connectors for aircraft structures and other assemblies.

It has long been the general practice to employ rivets, screws and welding to connect airplane parts and components. At points where it is necessary to service or inspect instrumentalities within the aircraft assembly it is the practice to provide access openings and to equip such openings with closures secured in place by releasable fasteners. The installation of multiplicities of rivets or screws, or the making of numerous welds is laborious, expensive and time consuming. Furthermore, there are many situations where the joints are inaccessible, at least at one side of the assembly, necessitating the employment of blind rivets, plate nuts, and the like. Where removable panels, closures, etc., are used, numerous releasable fastening devices are required and considerable expense is involved in the installation.

It is a general object of the present invention to provide simple, dependable structural connectors for use in aircraft asemblies, and other structures where preformed or prefabricated components are to be assembled, that obviates the necessity for employing rivets, screws and welds in the final assembling of the parts, sections or components. The joints or connecting devices of the invention eliminate the need for rivets, screws, and the like, in finally connecting the sections or components of the assembly and make it unnecessary to employ blind rivets, plate nuts or similar expedients in situations where the joints are inaccessible or inaccessible in part.

Another object of the invention is to provide structural connectors of the character referred to that are strong and dependable and positively connect the parts, sections or components of the assembly. The connectors are designed to effectively resist longitudinal shear as well as forces acting in all other directions and have a strength equal to or greater than the parts or components which they connect.

Another object of the invention is to provide structural connectors of the character mentioned that may be easily and quickly assembled without special tools or equipment.

A further object of the invention is to provide connectors of the general class referred to which present smooth flush or substantially flush surfaces at the joints and avoid all irregularities at the joints.

A still further object of the invention is to provide structural connectors of the class referred to that may be quickly released to permit disconnection of the assembled parts or sections. The connectors are strong and positive when assembled or made up and are not subject to failure or disconnection by vibration, but may be intentionally released with ease when it is desired to remove or disconnect the associated parts or sections. This feature of the invention particularly adapts the connectors for use with closures, panels or sections that are intended to be removed for the purpose of inspecting or servicing elements within the assembly.

Other objects and features of the invention will be readily understood from the following detailed description of typical preferred forms of the invention wherein reference will be made to the accompanying drawing in which, Figure 1 is a fragmentary perspective view of a typical aircraft assembly of the type in which connectors of the invention may be utilized;

Figure 2 is an enlarged transverse detailed sectional view of one form of joint or connection of the invention showing it associated with parts of an assembly;

Figure 3 is a fragmentary longitudinal detailed sectional view taken substantially as indicated by line 3—3 on Figure 2;

Figure 4 is a view similar to Figure 2 illustrating another form of connector of the invention;

Figure 5 is a fragmentary longitudinal detailed sectional view taken as indicated by line 5—5 on Figure 4 but showing the lock strip before it is locked; and, Figure 6 is a view similar to Figure 2 illustrating still another embodiment of the invention.

The joints or connectors of the invention are suitable for use in many different situations and in structures varying greatly in character. Furthermore, the invention is capable of substantial modification to adapt the connectors for given purposes and for use in given assemblies. I will herein describe the invention as employed in aircraft structures, it being understood that this is merely a typical application and is not to be construed as limiting either the scope or the utility of the invention.

In Figure 1 of the drawing I have illustrated a portion of an aircraft boom or fuselage comprising two sections S adapted to be connected by a joint structure or connector of the invention. Furthermore, the individual sections S are substantially cylindrical tubular elements and their axial seams or joints 10 may be provided with selected connectors of the invention. It is to be understood that the airplane assembly of Figure 1 is merely typical of many structures in which the connectors of the invention may be employed and the invention is not to be considered as limited for use on tubular assemblies or assemblies of any particular configuration.

Figures 2 and 3 of the drawing illustrate a typical preferred form of connector of the invention which comprises two members 11 formed to have locking cooperation one with the other, and a lock strip 12 for holding the members 11 in the interlocking relation.

The members 11 are intended to be secured to the edge portions of the components or sections A which are to be connected. In the drawing, the adjacent edge portions of the sections A are flat, it being understood that the connector may be used with sections that are curved or contoured. The members 11 are alike or complementary and where the connector is to be employed in an aircraft assembly the members 11 may be formed of a suitable aluminum alloy. In practice the members 11 may be extruded sections of aluminum alloy or the like. The members 11 resemble angle sections and have broad or extensive flanges 13 and inturned flanges 14 of less extent. The flanges 13 are intended to be attached to their respective components or sections A of the assembly. The flanges 13 may flatly or evenly engage the inner surfaces of the sections A and may be contoured to conform to contoured sections, although in most cases the flanges 13 are sufficiently flexible to readily conform to such contoured sections. In accordance with the invention, the flanges 13 are permanently secured to the sections A to be rigid therewith. The flanges 13 may be attached to the sections A by rivets 9, screws, spot welds, or roll welds. It is usually preferred to positively secure the flanges 13 to their respective sections A throughout the lengths of the flanges.

The inturned flanges 14 of the members 11 are in the nature of rims or beads which preferably extend throughout the entire lengths of the members. The flanges 14 extend along the inner or opposing edges of the flanges 13 and are thickened to have bulbs 15 which present convex surfaces or shoulders 16 at what I will term the rear faces of the flanges 14. The inner and outer corners of the flanges 14 are also preferably rounded about suitable radii. In the preferred construction the forward sides or faces of the flanges 14 are formed to have locking or meshing cooperation to assume the longitudinal shear forces to which the assembly may be subjected. Multiplicities of teeth or serrations 17 are provided on the forward faces of the flanges 14. The serrations 17 may be of any selected cross sectional configuration. It is usually preferred to employ serrations 17 of V-shaped cross section, as illustrated in Figure 3, to provide maximum contact and to assure full uniform mating of the serrations. The series of serrations 17 may extend throughout the entire length of the connector and may be of substantial width. In forming the serrations the flanges 13 of the two members may be arranged in back-to-back relation, and the two members then may be simultaneously passed through a roll machine to form identical serrations 17 in the faces of the tow flanges 14. This mode of forming the serrations 17 assures perfect mating or cooperation of the serrations when the connector is assembled. The members 11 are attached to the sections A to be in the relationship where their serrations mesh when the sections A are brought into the required assembled positions. It will be seen that when the serrations 17 are in full mesh the connector is capable of assuming extremely heavy longitudinal shear loads.

The lock strip 12 is provided to retain the members 11 in the positions where their serrations 17 are in full mesh and further serves to lock or hold the members 11 against relative transverse movement or displacement. The lock strip 12 is channel shaped or substantially U-shaped in transverse cross section having two spaced side parts 18. The strip 12 is shaped and proportioned to engage around the interlocking flanges 14 and its side parts 18 are shaped to cooperate with the flanges. Enlargements or bulbs 19 are provided on the inner surfaces of the side parts 18 and present convex rounded shoulders 20 for cooperating with the shoulders 16 of the flanges 14. The flanges 14 have curved concave external surfaces adapted to receive the bulbs 19 to allow full engagement of the shoulders 20 with the shoulders 16. When the sections A have been brought to the relationship where the serrations 17 are in meshing engagement, the lock strip 12 is slid onto the flanges 14 to bring the shoulders 20 into engagement with the shoulders 16. This locks the connector so that the sections A are positively connected against relative movement and displacement in all directions. The walls of the trough or channel 21 in the lock strip 12 are shaped to conform to or readily receive the bulbed edges of the flanges 14. The lock strip 12 may be proportioned to extend throughout the entire length of the joint and is preferably uniform in transverse configuration to have even engagement with the flanges 14.

Means may be provided to prevent longitudinal displacement or movement of the lock strip 12. This means may comprise a pin or screw 22 engaged in openings in the strip 12 and a flange 14. The pin or screw 22 is preferably adjacent one end of the connector to be accessible. There is little or no tendency for the lock strip 12 to move longitudinally and the screw 22 is not required in all installations. In some instances a holding means for the lock strip 12 is entirely unnecessary. For example, in some structures elements of the assembly may engage the opposite ends of the lock strip 12 to hold it against endwise movement.

In situations where the joint or connector is subject to heavy transverse shear loads it may be desired to employ a key 23 to assist in assuming such loads. Where the key 23 is to be used, partially cylindrical longitudinal grooves 24 are provided in the serrated forward faces of the flanges 14. The grooves 24 oppose one another and register to constitute a cylindrical opening for receiving the cylindrical key 23. The key 23 is passed or slid into this opening from one end of the assembly. It will be seen that the key 23 engaged in the grooves 24 is capable of assuming heavy transverse shear loads that may be imposed on the assembly. The key 23 is optional and is not required in all cases. Where the key 23 is not used the channel shaped lock strip 12 conforming to the flanges 12 and the bulbs 15 thereon positively prevents relative transverse displacement of the assembled sections A and dependably assumes transverse shear loads. Furthermore, the lock strip 14 engaging about the flanges 14 prevents separation of the sections and dependably transmits and assumes tension to which the assembly may be subjected.

From the above it will be seen that the connector illustrated in Figures 2 and 3 is easily made up or assembled to positively connect the sections A of the structure. The sections A may be prefabricated to have the members 11 secured to their edge portions and in making up the connection the sections A are first brought to the positions where the serrations 17 mesh. Where the key 23 is employed, the key is then inserted into the registering grooves 23 and the lock strip 12 is slid over the flanges 14. This completes the assembling operations. The mating serrations 17 are capable of assuming very heavy longitudinal shear loads and the key 23 and lock strip 12 engaged with the flange parts 14 dependably hold the connected sections against relative movement in all other directions. The connection is strong and positive and will not work loose under any conditions of operation or usage. When it is desired to disconnect the sections A, the lock strip 12 is merely slid from the flanges 14, and where the key 23 is employed the key is withdrawn from the grooves 23. This frees the sections A for disconnection. The connector illustrated in detail in Figures 2 and 3 is used at the axial joints 10 in the assembly of Figure 1; this being one typical application of the connector.

The joint or connector illustrated in Figures 4 and 5 is such that it may be assembled or made up from the exterior of the structure and is therefore advantageous in situations where the interior of the structure is inaccessible. The connector is useful with closures for access openings, and the like, although not limited to such applications, and in Figure 1 I have shown the connector joining the two sections S of the boom assembly. The construction of Figures 4 and 5 comprises two members 30 connected to the assembly sections B and formed to have meshing or interlocking cooperation, and a locking strip 31 for holding the members 30 in the interlocking relationship.

The members 30 are secured to the edge portions of the sections B as by rivets 32, screws or welding. The members 30 are identical angular elements and when formed of an aluminum or magnesium alloy, may be extruded sections. It is preferred to provide the members 30 with flanges 33 similar to the flanges 13. The flanges 33 are arranged against the inner faces of the sections B and are secured to the sections by the rivets 32 or other selected attaching means.

The members 30 further include inturned or inwardly projecting flanges 34 on the main flanges 33. The flanges 34 are substantially U or J-shaped in transverse cross section extending inwardly from the flanges 33, then curving laterally in substantially parallel relation to the planes of the sections B and then extending outwardly or toward said plane. I will term the outwardly extending portions, flange parts 35. Bulbs 36 are provided on the outer edge portions of the flange parts 35. The bulbs 36 present curved or convex shoulders in the troughs of the J flanges 34. In accordance with the invention, the opposing faces of the flange parts 35 have multiplicities of teeth or serrations 37. The series of serrations 37 preferably extend throughout the lengths of the flange parts 35 and the serrations of the two members are identical to accurately mesh. I have shown the serrations 37 of V-shaped transverse cross section, and the serrations 37 may be formed in the same manner as the serrations 17.

The locking strip 31 is an elongate element designed to engage about the flange parts 35 to hold them in the relationship where their serrations 37 are in complete mesh. Where the connector parts are formed of aluminum alloy, or the like, the strip 31 may be an extruded section. The strip 31 is channel shaped in transverse cross section having two spaced generally parallel side parts 37ª and a connecting portion 38. The side parts 37ª are proportioned to fit within the troughs of the J-shaped flanges 34. Bulbs 39 are provided on the side parts 37ª and engage under or interlock with the bulbs 36 of the flange parts 35. Figure 4 clearly illustrates the manner in which the bulbs 36 and 39 engage or interlock to retain the members 30 and their sections B in the correctly assembled relationship. It will be observed that the bulbed flange parts 35 substantially conform to the trough of the lock strip 31 with the bulbs 36 engaging over the bulbs 39. This interlocking engagement of the strip 31 and members 30 positively holds the sections B against relative transverse displacement and maintains the serrations 37 in mesh for the dependable transmission of longitudinal shear loads. It is preferred to make the outer face 40 of the lock strip 31 flat or of the same contour as the sections B and to proportion the parts so that the face 40 lies flush with the outer surfaces of the sections B. This provides a flush joint and is of importance in aircraft where aerodynamic designs require flush joints. The lock strip 31 may be readily slid to the position where it cooperates with the flange parts 35 throughout the entire length of the connection. The strip 31 is merely entered into the connection at one of its ends and advanced to its final position. If required, the strip 31 may be secured in its final position by a screw or pin 41 engaged in openings in the strip and a part 35 adjacent one end of the connector.

The connector of Figures 4 and 5 may be constructed to provide for the quick ready assembly of the sections B. The parts may be formed so that the lock strip 31 may be assembled in its final position by merely introducing the side parts 37ª into the troughs of the flanges 34 and then shifting the strip a short distance in either longitudinal direction. As best illustrated in Figure 5, the bulbs 36 of the flange parts 35 have pluralities of spaced interruptions or notches 42. The notches 42 may be equally spaced and formed to leave teeth or projections 43 of equal width. The bulbs 39 of the parts 37ª have similar spaced interruptions or notches 44 leaving teeth or projections 45.

In assembling the construction of Figures 4 and 5, the sections B are first brought to the positions where the serrations 37 are in full meshing engagement. The strip 31 is then arranged so that its side parts 37ª enter the troughs of the flanges 34 and the strip is lowered or pressed inwardly so that the projections 45 pass through the notches 42. Figure 5 illustrates this position of the strip 31. The strip 31 is then moved longitudinally in either direction a distance equal to the width of the projections 43 so that the projections 45 of the bulbs 39 engage under the projections 43 of the bulbs 36. The strip 31 may then be secured in this position by the pin or screw 41. It will be observed that the connection may be readily assembled in situations where it is difficult or impossible to enter the strip 31 from one end of the connection.

The joint or connector of Figure 6 comprises two members 47 in meshing cooperation and a key or lock strip 48 for holding the members locked together.

The members 47 may be identical and in practice may be cut from the same length of stock. The members 47 are elongate elements having main flanges 49 which may be secured to the sections C of the assembly by screws or rivets 50. Where the parts are formed of an aluminum or magnesium alloy, the members 47 may be extruded parts. The members 47 may extend throughout the entire length of the joint or connection.

The members 47 are further provided with what I will term flange parts 51. The flange parts 51 extend along the adjacent or opposite edges of the members 47 and their forward or opposing faces are serrated. The faces of the flange parts 51 are provided with serrations 52 similar to the above described serrations 17 and 37. The serrations 52 are adapted to mesh when the sections C are in the correct assembled relationship. The mating serrations 52 of the two members 47 are capable of assuming very heavy longitudinal shear loads.

The flange parts 51 are shaped to receive the internal lock key or strip 48. Each part 51 has a longitudinally extending opening 53 and a slot 54 extending from its serrated face to join the opening 53. The slots 54 have flat generally parallel walls lying in planes parallel with the plane occupied by the sections C. The walls 55 of the openings 53 at the ends of the slots 54 are flat and substantially normal to the walls of the slots.

The locking strip 48 is inserted in the slots 54 and openings 53 to positively lock or key the members 47 together in the assembled relation where the serrations 52 are in mesh. The key strip 48 is shaped to generally conform to the slots 54 and openings 53. The strip 48 may be an extruded section of aluminum alloy, or the like, where the members 47 are formed of such material. The lock strip 48 has a central web 56 and thickened portions or beads 57 which extend along its longitudinal edges. The web 56 is shaped and proportioned to fit the slots 54 and the beads 57 are shaped to freely fit the openings 53. The web 56 may have flat surfaces for engaging with the flat walls of the slots 54 and the beads 57 preferably have shoulders 58 for engaging with the walls 55 of the openings 53.

In assembling the connector of Figure 6, the sections C are first brought to the correct assembled relationship where the serrations 52 are in full mesh. The key strip 48 is then inserted in an end of the connector assembly to pass into the slots 54 and openings 53. The strip 48 is advanced or moved to the final position where it may extend throughout the entire length of the connector. The strip 48 engaged in the slots 54 and openings 53 positively locks the members 47 against transverse displacement and lateral separation. The interfitting serrations 52 secure the sections C against relative longitudinal movement and are capable of assuming heavy longitudinal shear load. There is little or no tendency for the key strip 48 to become displaced, but if desired a pin or screw 59 may be engaged in openings in a flange part 51 and the key strip adjacent an end of the connector to hold the strip against longitudinal movement. The joint of Figure 6 may be readily released to permit disconnection of the sections by merely removing the screw 59 and then withdrawing the strip 48.

The present invention provides structural connectors that are easily and quickly assembled without the necessity of using multiplicities of screws, rivets or the like, and without the use of special tools. The connectors are positive when assembled and are capable of withstanding heavy loads in all directions. The connectors are such that the joints may be flush and without irregularities of any kind whatsoever.

Having described only typical forms of the invention I do not wish to be limited to the specific details herein set forth, but wish to reserve to myself any variations or modifications that may appear to those skilled in the art or fall within the scope of the following claims.

I claim:

1. A connector for securing two elements together in assembled relation to have exposed faces in a common plane comprising a member to be attached to each element to extend along an edge thereof, a flange part extending along each member, said flange parts projecting toward said plane and presenting opposing forward faces, serrations on the opposite forward faces of the flange parts extending in a direction generally transverse of said edges and adapted to mate to hold the elements against relative longitudinal movement, longitudinally extending bulbs on the rear faces of the flange parts, and a channel key slid onto the flange parts to hold their serrations in mesh and having bulbs for cooperating with the first named bulbs to prevent relative transverse movement between the elements, the channel key presenting a surface occupying said plane to be flush with said faces and substantially closing the space between said faces.

2. A connector for securing two elements together in assembled relation comprising a member to be attached to each element to extend along an edge thereof, a channeled flange part extending longitudinally of each member at the inner side of its respective element, each flange part having an inwardly extending flange and a flange extending outwardly from the inwardly extending flange, serrations on opposing faces of said outwardly extending flanges in a generally transverse direction and adapted to mate to hold the elements against relative longitudinal movement, and a channel shaped key engaged between said inwardly and outwardly extending flanges of the flange parts to hold the serrations in mesh and to prevent relative transverse movement of the elements.

3. A connector for securing two elements together in assembled relation comprising a member to be attached to each element to extend along an edge thereof, a channeled flange part extending longitudinally of each member at the inner side of its respective element, serrations on opposing faces of the flange parts extending in a generally transverse direction and adapted to mate to hold the elements against relative longitudinal movement, and a channel key engaged in said channeled flange parts to hold the serrations in mesh and to prevent relative transverse movement of the elements, said key presenting a surface that is substantially flush with the outer faces of the elements.

4. A connector for securing two elements together in assembled relation to have corresponding faces in a common plane comprising a member to be attached to each element to extend along an edge thereof, a channeled flange part extending longitudinally of each memebr at the inner side of its respective element, serrations on opposing faces of the flange parts extending in a generally transverse direction and adapted to mate to hold the elements against relative longitudinal movement, and a channel key removably slid into said channeled flange parts from an end of the connector to hold the serrations in mesh and to lock the elements against relative transverse movement, the key presenting a surface which is flush with said faces of the elements.

5. A connector for securing two elements together in assembled relation to have corresponding faces in a common plane comprising a member to be attached to each element to extend along an edge thereof, a channeled flange part extending longitudinally of each member at the inner side of its respective element, the flange parts having channels facing outwardly toward said plane, serrations on opposing faces of the flange parts extending in a generally transverse direction and adapted to mate to hold the elements against relative longitudinal movement, bulbs in the channels of said parts, a channel key removably engaged in said channels to hold the serrations in mesh, and bulbs on the key cooperating with the first named bulbs to prevent relative transverse movement of the parts.

6. A connector for securing two elements together in assembled relation to have corresponding faces in a common plane comprising a member to be attached to each element to extend along an edge thereof, a channeled flange part extending longitudinally of each member at the inner side of its respective element, the flange parts having channels facing outwardly toward said plane, serrations on opposing faces of the flange parts extending in a generally transverse direction and adapted to mate to hold the elements against relative longitudinal movement, bulbs in the channels of said parts, a channel key removably engaged in said channels to hold the serrations in mesh and presenting a surface that is flush with said faces of the elements, and bulbs on the key cooperating with the first named bulbs to prevent relative transverse movement of the parts, the first and second named bulbs being notched so that the key may be entered into said channels in a transverse direction and then moved longitudinally to engage the second named bulbs under said first named bulbs.

ANDRÈ CROT.